(12) United States Patent
Lee et al.

(10) Patent No.: US 10,021,387 B2
(45) Date of Patent: Jul. 10, 2018

(54) PERFORMANCE AND BANDWIDTH EFFICIENT FRACTIONAL MOTION ESTIMATION

(75) Inventors: Sang-Hee Lee, Santa Clara, CA (US); Jason D. Tanner, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 266 days.

(21) Appl. No.: 13/995,564

(22) PCT Filed: Apr. 26, 2012

(86) PCT No.: PCT/US2012/035246
§ 371 (c)(1),
(2), (4) Date: Mar. 11, 2014

(87) PCT Pub. No.: WO2013/158125
PCT Pub. Date: Oct. 24, 2013

(65) Prior Publication Data
US 2014/0185679 A1    Jul. 3, 2014

Related U.S. Application Data

(60) Provisional application No. 61/635,943, filed on Apr. 20, 2012.

(51) Int. Cl.
*H04N 11/02* (2006.01)
*H04N 19/583* (2014.01)
(Continued)

(52) U.S. Cl.
CPC ....... *H04N 19/00733* (2013.01); *H04N 19/51* (2014.11); *H04N 19/523* (2014.11);
(Continued)

(58) Field of Classification Search
CPC ................................................ H04N 19/00733
(Continued)

(56) References Cited

U.S. PATENT DOCUMENTS

2003/0021344 A1    1/2003 Panusopone et al.
2005/0105615 A1*   5/2005 El-Maleh ............. H04N 19/139
                                                  375/240.12
(Continued)

FOREIGN PATENT DOCUMENTS

CN    101039423 A    9/2007
CN    101472181 A    7/2009
(Continued)

OTHER PUBLICATIONS

Extended European Search Report received for European Patent Application No. 12874793.8, dated Oct. 20, 2015, 8 pages.
(Continued)

*Primary Examiner* — Leron Beck
(74) *Attorney, Agent, or Firm* — Schiff Hardin LLP

(57) ABSTRACT

Described herein are techniques related to motion estimation for video encoding. In particular, integer estimation is performed on a reference video frame, and a best size macro block is determined. A fractional estimation is performed on that best size macro block. Based on the fractional estimation, a determination is made if an improvement occurs over the macro block from the integer estimation. If such an improvement occurs, then all sub shapes of the best size macro block from the integer search/estimation are updated. Furthermore, the new sub macro block is chosen as the final macro block to be used for video encoding.

20 Claims, 6 Drawing Sheets

(51) Int. Cl.
  *H04N 19/56* (2014.01)
  *H04N 19/51* (2014.01)
  *H04N 19/533* (2014.01)
  *H04N 19/523* (2014.01)
  *H04N 19/57* (2014.01)

(52) U.S. Cl.
  CPC .......... *H04N 19/533* (2014.11); *H04N 19/56* (2014.11); *H04N 19/57* (2014.11)

(58) Field of Classification Search
  USPC ........................................ 375/240.01–240.29
  See application file for complete search history.

(56) References Cited

U.S. PATENT DOCUMENTS

| | | | |
|---|---|---|---|
| 2005/0152452 A1* | 7/2005 | Suzuki | H04N 19/176 375/240.16 |
| 2006/0109909 A1 | 5/2006 | Chang et al. | |
| 2006/0203905 A1* | 9/2006 | Hsia | H04N 19/433 375/240.2 |
| 2009/0168883 A1* | 7/2009 | Lu | H04N 19/139 375/240.16 |
| 2009/0296812 A1* | 12/2009 | Kim | H04N 19/176 375/240.12 |
| 2011/0135008 A1 | 6/2011 | Han et al. | |
| 2011/0216829 A1* | 9/2011 | Raveendran | H04N 19/40 375/240.12 |
| 2012/0020410 A1 | 1/2012 | Chang et al. | |
| 2012/0177119 A1* | 7/2012 | Dwarakapuram | H04N 19/43 375/240.16 |

FOREIGN PATENT DOCUMENTS

| | | |
|---|---|---|
| EP | 2 076 046 A2 | 7/2009 |
| KR | 10-2010-0013139 A | 2/2010 |
| KR | 10-2011-0065335 A | 6/2011 |
| TW | 200942044 A | 10/2009 |
| TW | 201121334 A | 6/2011 |
| WO | 2013/158125 A1 | 10/2013 |

OTHER PUBLICATIONS

International Search Report and written Opinion received for PCT Patent Application No. PCT/US2012/035246, dated Jan. 17, 2013, 8 pages.
International Preliminary Report on Patentability and Written Opinion received for PCT Patent Application No. PCT Application No. PCT/US2012/035246, dated Oct. 30, 2014, 5 pages.
Office Action and Search Report received for Taiwan Patent Application No. 102113603, dated Jun. 13, 2016, 8 pages of Taiwan Office Action and 2 pages of Taiwan search report including 1 page of English translation.
Notice of Allowance received for Taiwan Patent Application No. 102113603, dated Apr. 17, 2017, 3 Pages of Taiwanese Notice of Allowance including 1 Page of English Translation.
Office Action received for European Patent Application No. 12874793.8, dated Mar. 28, 2017, 8 pages.
Office Action received for Chinese Patent Application No. 201280071900.4, dated Nov. 28, 2016, 8 pages of Chinese Office Action Only.
Wiegand et al., "Overview of the H.264/ AVC Video Coding Standard", IEEE Transactions on Circuits and Systems for Video Technology, vol. 13, No. 7, Jul. 2003, pp. 560-576.

* cited by examiner

PERFORMANCE AND BANDWIDTH EFFICIENT FRACTIONAL MOTION ESTIMATION

This application claims priority to U.S. Provisional Patent Application No. 61/635,943, entitled "PERFORMANCE AND BANDWIDTH EFFICIENT FRACTIONAL MOTION ESTIMATION," filed on Apr. 20, 2012.

BACKGROUND

Video coding is a process of preparing video (video data), where the video is encoded to meet proper formats and specifications for recording and playback. Motion estimation is an important and computationally intensive task in video coding and video compression.

The Video Coding Experts Group (VCEG), together with the International Organization for Standardization (ISO)/International Electrotechnical Commission (IEC) joint working group, the Moving Picture Experts Group (MPEG), has developed the Advanced Video Coding (AVC) standard. The AVC standard, or AVC, is also known as H.264. AVC is an example of a standard for video encoding, and is one of the most commonly used formats for the recording, compression, and distribution of high definition video. Other standards include and are not limited to, Motion Pictures Experts Group 2 (MPEG2), Scalable Video Coding (SVC), and High Efficiency Video Coding (HEVC), etc.

As an example, AVC implements units of macro blocks of 16×16 pixels. The 16×16 macro blocks may be made up of smaller blocks (macro blocks), such as 16×8, 8×8, 4×4, etc. Motion estimation may be used in video compression schemes. Motion estimation may be performed to find a motion vector pointing to the best prediction macro block in a reference frame. Redundancy between adjacent frames may be determined where a frame is selected as a reference and subsequent frames are predicted from the reference frame using motion estimation. The motion estimation process may analyze previous or future frames to identify blocks/shapes that have not changed. In certain implementations, motion vectors may be stored in place of blocks.

The process of video compression using motion estimation is known as inter-frame coding. For inter-frame coding (also known as temporal coding), the macro blocks may be coded using blocks of pixels in previous or future encoded frames. In contrast, intra-frame coding (also known as spatial coding), the macro blocks may be encoded using blocks of pixels that are already encoded within the current frame. Motion estimation provides finding a match of pixel blocks in inter-frame coding.

AVC allows for variable macro block size motion estimation, which may also lead to higher computational complexity. In video encoding, there are a spatial part and a temporal part. For a first or reference frame, the frame is divided into a 16×16 macro block. For spatial prediction, this stage uses pixels in the first or current frame to predict the macro block that may perform processes such as compression (i.e., calculate coefficients in the current macro block). After any special predicted frames, there can either be spatially or temporally predicted frames. For temporally predicted frames, the current frame is taken and the previously encoded frame is looked to and determined if the previously encoded frame matches well with current frame. Temporal prediction may break down the macro block (e.g., 16×16) into a smaller macro block (e.g., 4×4).

Integer motion estimation may be performed, followed by fractional estimation. The fractional estimation is performed searching a smaller region fractionally, thereby avoiding having to search every possible fractional region shape combination, which would be performance limiting. The estimation is performed in order to gain compression without sacrificing quality, achieving lower bandwidth and better quality.

The larger the macro block, the less the number of bits; however, larger macro blocks may require more coefficients for compression, if the frames match well. Therefore, by splitting up the macro blocks through variable block size motion estimation, even though there are more bits, there are fewer coefficients, and the compression is more efficient.

After the integer estimation/search and fractional estimation/search is performed, if every possible shape combination is performed of all shapes searched, performance becomes very limited because of all of the possible shape combinations. A determination is made as to the best macro block/shape from the integer search point of view, and then a check/search is performed on that one shape fractionally. This method foregoes quality by not checking, searching, and updating for other macro blocks/shapes.

The following Detailed Description is provided with reference to the accompanying figures. In the figures, the left-most digit(s) of a reference number usually identifies the figure in which the reference number first appears. The use of the same reference numbers in different figures indicates similar or identical items.

DETAILED DESCRIPTION

This document discloses one or more systems, apparatuses, methods, etc. for implementing fractional motion estimation for video encoding. Throughout this document, the terms "estimation" and "search" are used interchangeably. Furthermore, the terms "macro block" and "shape" are used interchangeably. In an implementation, an integer estimation is performed on a video frame and the best size macro block is determined. Using the best size macro block, a fractional estimation is performed. From the fractional search/estimation, a determination is made if an improvement occurs over the macro block from the integer estimation. If such an improvement occurs, then all sub shapes of the best size macro block from the integer estimation, are updated. This may lead to increase efficiency and greater quality by updating smaller macro blocks in the video encoding process. Example implementations include a virtual machine environment (VME) to improve compression of video.

Figure 1:
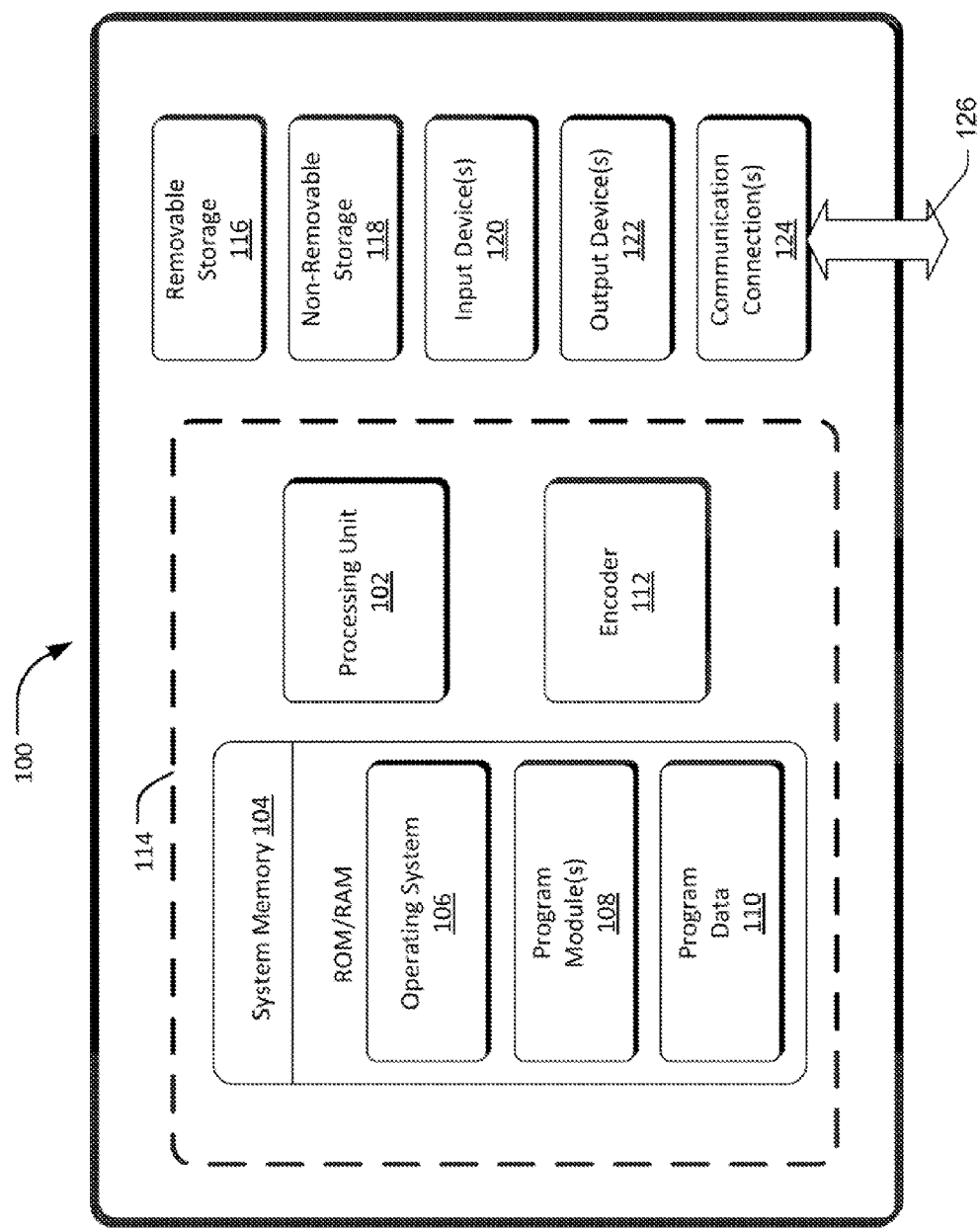
FIG. 1 illustrates an example system for implementing integer motion estimation and fractional motion estimation for best integer motion estimation macro block for video encoding.

FIG. 1 shows an example system that may be utilized to implement various described embodiments. However, it will be readily appreciated that the techniques disclosed herein may be implemented in other computing devices, systems, and environments. The computing device 100 shown in FIG. 1 is one example of a computing device and is not intended to suggest any limitation as to the scope of use or functionality of the computer and network architectures.

In at least one implementation, computing device 100 includes at least one processing unit 102 and system memory 104. Depending on the exact configuration and type of computing device, system memory 104 may be volatile (such as RAM), non-volatile (such as ROM, flash memory, etc.) or some combination thereof. System memory 104 may include an operating system 106, one or more program modules 108, that in certain implementations may implement the video motion estimation methods and techniques describe herein. System memory 104 may further include program data 110 which may include macro blocks/shapes database(s) as described later in this document. Furthermore, an encoder 112 is included in this example. The encoder 112 may be used to implement video encoding, motion estimation, motion compensation, etc. as describe herein. The encoder 112 may be operatively coupled to and communicate with processing unit 102, system memory 104, and other memory, input/output, devices, further described herein, and other components/devices not shown. A basic implementation of the computing device 100 is demarcated by a dashed line 114. For example, in certain implementations, encoder 112 may be part of an integrated graphics chip set in of central processing units (CPU) that includes 3D and media, having media functionality that includes video, specifically video decode/encode. In certain implementations, an application specific integrated circuit or ASIC may include the encoder 112 as a fixed function encoder.

It is contemplated that devices with video encoding may make use of the techniques, methods, and devices described. Examples of such devices include media players, video conferencing devices, etc.

In certain implementations, program modules 108 may include specific modules (not shown) such as a codec or software/firmware based encoder, configured to implement the video encoding techniques and methods described herein. For example, such modules in certain implementations may perform the processes of encoder 112. Example codecs include AVC, VC1, ATVC, and SVC.

Computing device 100 may have additional features or functionality. For example, computing device 100 may also include additional data storage devices such as removable storage 116 and non-removable storage 118. In certain implementations, the removable storage 116 and non-removable storage 118 are an example of computer accessible media for storing instructions that are executable by the processing unit 102 to perform the various functions described above. Generally, any of the functions described with reference to the figures may be implemented using software, hardware (e.g., fixed logic circuitry) or a combination of these implementations. Program code may be stored in one or more computer accessible media or other computer-readable storage devices. Thus, the processes and components described herein may be implemented by a computer program product. As mentioned above, computer accessible media includes volatile and non-volatile, removable and non-removable media implemented in any method or technology for storage of information, such as computer readable instructions, data structures, program modules, or other data. The terms "computer accessible medium" and "computer accessible media" refer to non-transitory storage devices and include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium that may be used to store information for access by a computing device, e.g., computing device 100. Any of such computer accessible media may be part of the computing device 100.

In one implementation, the removable storage 116, which is a computer accessible medium, has a set of instructions stored thereon. When executed by the processing unit 102, the set of instructions cause the processing unit 102 to execute operations, tasks, functions and/or methods as described herein, and any variations thereof.

Computing device 100 may also include one or more input devices 120 such as keyboard, mouse, pen, voice input device, touch input device, etc. Computing device 100 may additionally include one or more output devices 122 such as a display, speakers, printer, etc.

Computing device 100 may also include one or more communication connections 124 that allow the computing device 100 to communicate by wire or wirelessly with one or more other devices, over connection 126. It is appreciated that the illustrated computing device 100 is one example of a suitable device and is not intended to suggest any limitation as to the scope of use or functionality of the various embodiments described.

Figure 2:
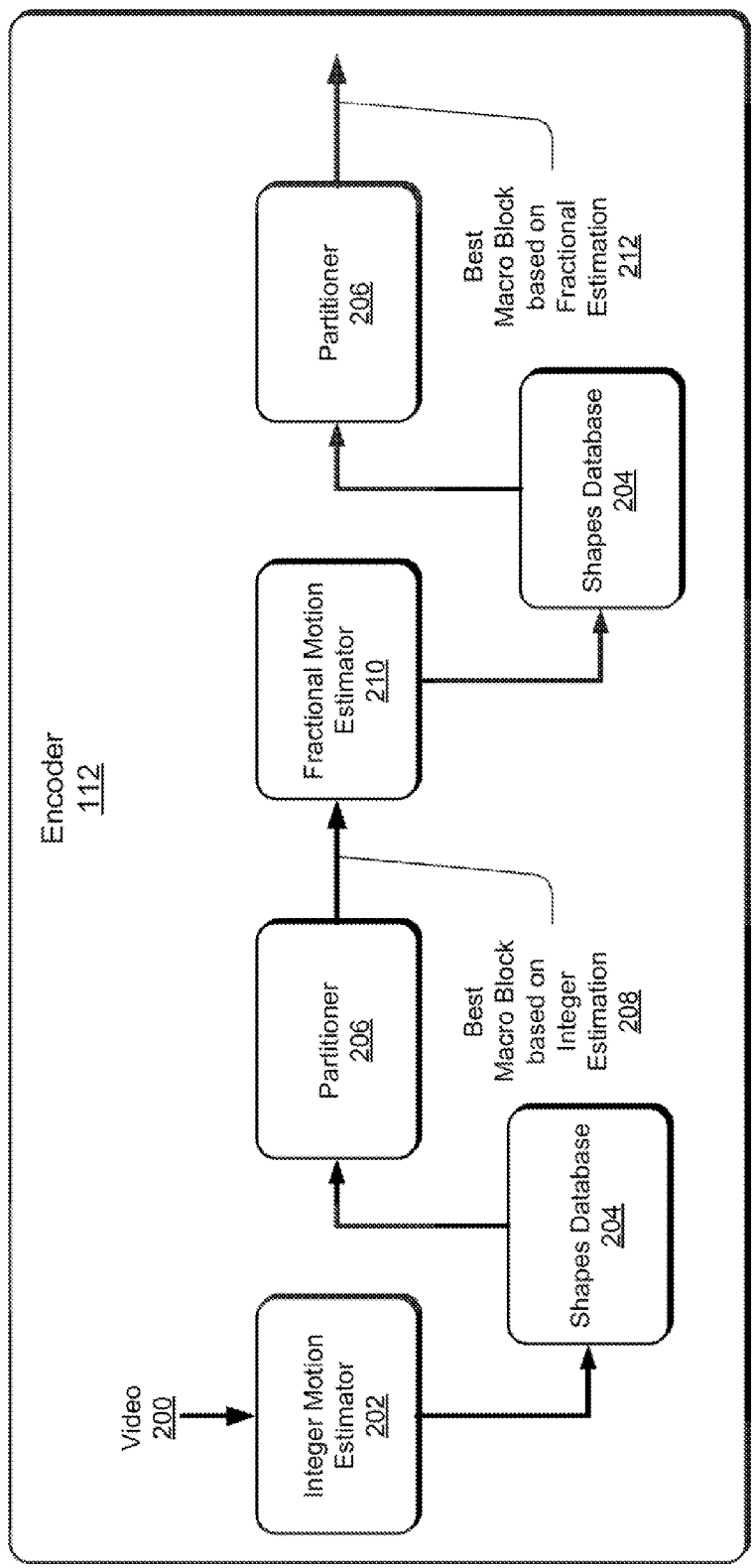
FIG. 2 illustrates an example video encoder for implementing integer motion estimation and fractional motion estimation for best integer motion estimation macro block for video encoding.

FIG. 2 shows an example video encoder 112 for implementing integer motion estimation and fractional motion estimation. In certain implementations, video encoder 112 may be implemented as part of a central processing unit, part of integrated circuit chipset, or be a separate component/device. As discussed above, in certain implementations, the video encoder 112 may be implemented as firmware or software, such as a codec.

Video 200 is received from one of various sources, including memory, video source, etc. In particular, the received video 200 is to be encoded/compressed by encoder 112. A video frame, which becomes a current reference frame, of video 200 is received by an integer motion estimator component 202. The integer motion estimator component 202 performs an integer search for the best shape or macro block of the reference frame. Best shape or macro block may be determined as that macro block with the lowest distortion.

For example, the best shape or macro block may be 16×16, having the lowest distortion of the macro blocks. After the integer search a record or shapes database 204 is updated for only for 16×16 shapes. The shapes database 204 is a record of shape combinations for various macro blocks, including the 16×16 macro block and all sub blocks (e.g. 16×8, 8×8, 4×4, etc.). For example, in AVC there are 41 shape combinations, therefore a record is kept for the best of the 41 shape combinations in shapes database 204.

A partitioner component 206 provides the best shape or macro block 208 (e.g., 16×16 shape) as determined by the integer motion estimator component 202. Using the best shape or macro block 208, a fractional motion estimator 210 performs a fractional search on the best shape or macro block 208 (e.g., 16×16 shape).

The fractional motion estimator 210 performs a fractional prediction on current pixels of the best shape or macro block 208 (e.g., 16×16 shape) and interactively interpolates the fractional locations to determine improvement as to a sub macro block of the best macro block. Since checking is performed on a larger 16×16 shape macro block, the underlying pixels may be checked for smaller macro block shapes fractionally. With the 16×16 best shape or macro block 208, there are lower shapes (e.g. 16×8, 8×8, 4×4, etc.) and the shapes database (i.e., record) 204 is updated with those smaller shapes, at the same time the 16×16 shape is updated. In certain implementations, a different shapes database is provided along with shapes database 204.

If it is determined that shapes or macro blocks smaller than the best shape or macro block 208 has improved, then a decision is made to change from the 16×16 best shape or macro block 208 to a smaller size and use that size for encoding. Therefore, the partitioner component 206 provides a best macro block based on fractional estimation 212 and further updates the macro block of the reference frame for final video encoding. The "new" best macro block or shape 212, may be the previous best shape or macro block 208 (e.g. 16×16), or a sub macro block (e.g. 16×8, 8×8, 4×4, etc.).

Therefore, by updating the records of smaller sized shapes based on the larger size shape, performance is not compromised, since a fractional search is performed regardless on the larger shape, and better quality can be achieved, since a smaller size macro block can be determined. The encoder 112 provides updating the record multiple shapes or macro blocks, updating the record during fractional searching, and changing mode selection or macro block size during the fractional searching.

Figure 3:
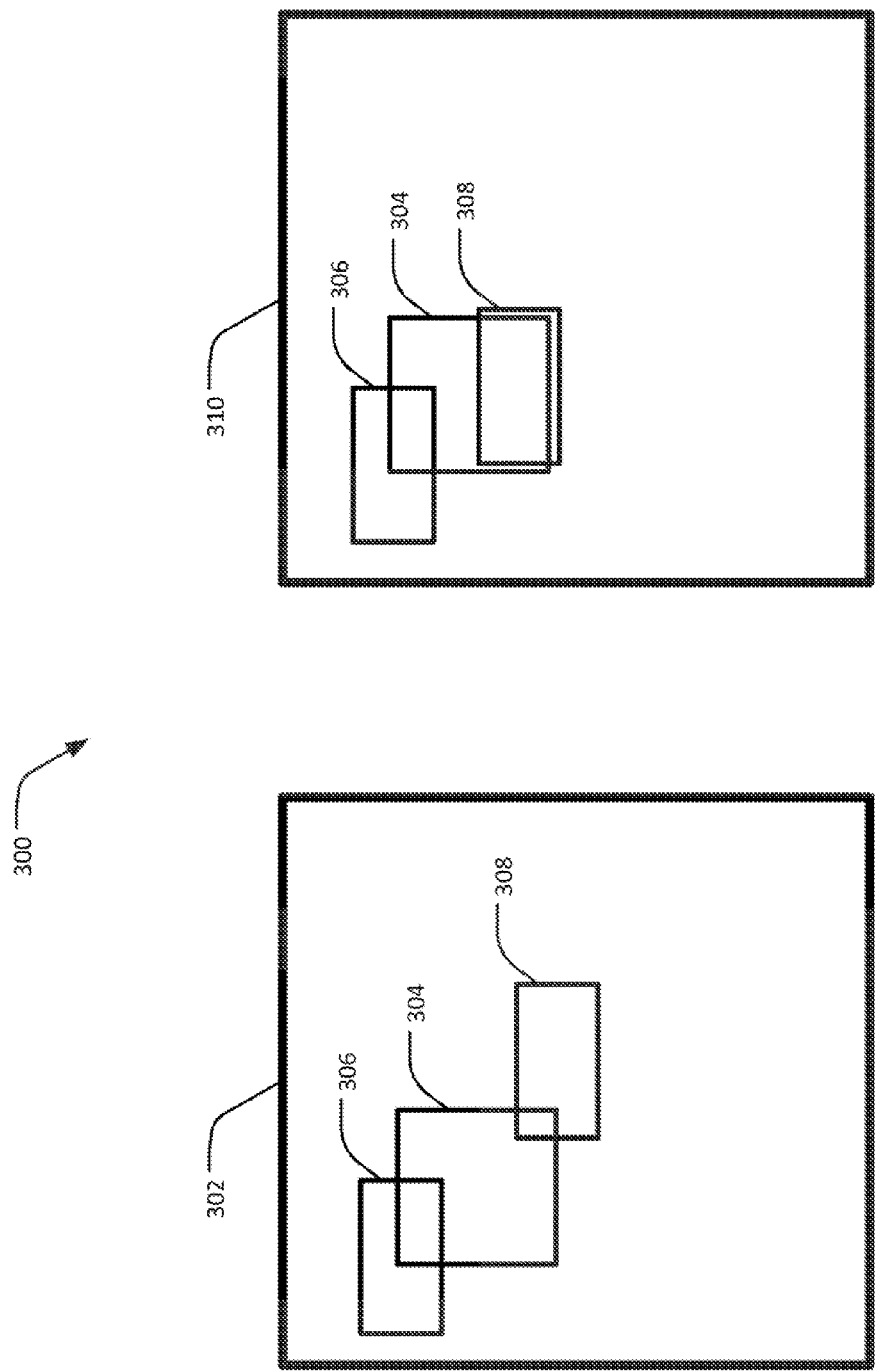
FIG. 3 illustrates an example integer motion estimation and fractional motion estimation for best integer motion estimation macro block performed on a video frame.

FIG. 3 shows an example integer motion estimation and fractional motion estimation performed on a reference video frame 310. The frame 302 is video frame after an initial integer search/estimation. Frame 302 shows results after integer search is completed. The motion vector and distortions of the best shape or macro block, are used to make a decision on the final shape or macro block.

The shape decision in this example is 16×16. A 16×16 macro block 304 is represented by a motion vector of (0, 0). Two 16×8 macro blocks 306 and 308 make up the 16×16 macro block 304. 16×8 macro block 306 has a motion vector of (−8, −4), and 16×8 macro block 308 has a motion vector of (12, 4). Searching is performed on the 16×16 macro block 304 using the current frame 302 in checking a previously encoded frame if a good match may be found on the previously encoded frame. The 16×8 macro blocks 306 and 308 are searched as the same as the 16×16 macro block 304.

Different metrics may be used to determine if the previous frame aligns well with the current frame 302. Therefore, a distortion value may be determined based on such metrics. In this example, distortion for 16×16 macro block 304 is 200. Distortion for 16×8 macro block 306 is 100 and distortion for 16×8 macro block 308 is 120. Therefore the total for the two 16×8 macro blocks 306 and 308 adds up to 220.

The 16×16 macro block 304 is then checked/searched fractionally. During the fractional search, the 16×16 locations are checked, but not the 16×8 locations. So the fractional search is centered around (0, 0). But while doing the fractional searching, both 16×16 and 16×8 records get updated. In this example, as a result of fractional searching, both 16×16 and 16×8 are improved.

Frame 310 represents the frame 302, after fractional search. The 16×8 macro blocks 306 and 308 are not checked fractionally, thus saving performance resources. After fractional search, the 16×16 macro block 304 has a motion vector of (1, −1), representing a quarter pixel motion. The distortion for 16×16 macro block 304 is determined to be 190. During the fractional search of the 16×16 macro block 304, the shapes of the 16×8 macro blocks are updated. In this example, a better match is found for 16×8 macro block 308. Motion vector for 16×8 macro block 308 is now (2, 0) and distortion is determined to be 80. Motion vector for 16×8 macro block 306 is (−8, −4) and distortion remains at 100. Distortion for 16×16 macro block 304 is now greater than the combined distortion of 16×8 macro blocks 306 and 308. In other words, the distortion for 16×16 macro block 304 is 190 versus a combined distortion of 180 (i.e., 100+80) for macro blocks 306 and 308. Therefore the 16×8 macro block is chosen as a final macro block, since it has a lower distortion than the 16×16 macro block. As a result of the improvement, 16×8 becomes the final macro block instead of 16×16, providing an improvement in quality.

Figure 4:
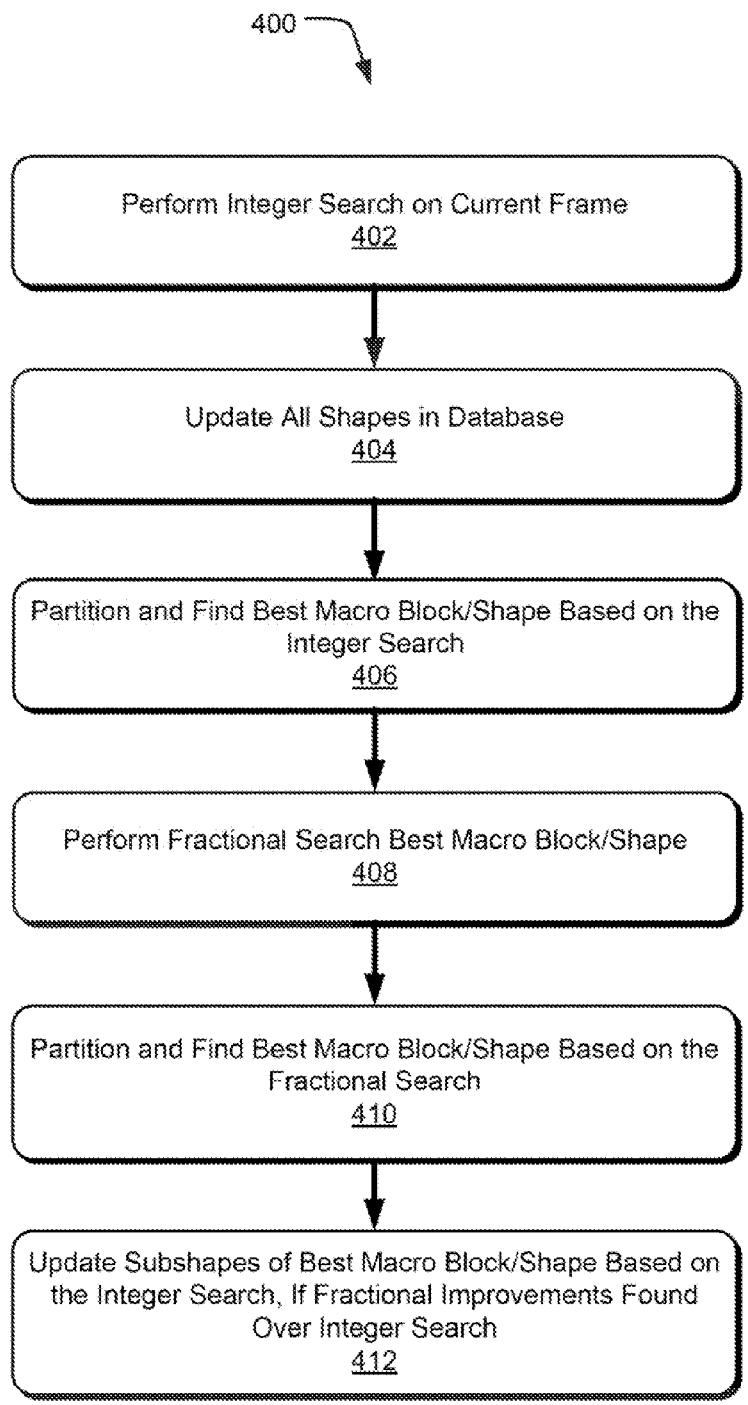
FIG. 4 illustrates an example method for integer motion estimation and fractional motion estimation for best integer motion estimation macro block for video encoding.

FIG. 4 shows an example process flowchart 400 illustrating an example method for integer motion estimation and fractional motion estimation for best integer motion estimation macro block for video encoding. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 402, performing an integer search on a reference frame is performed. In particular, the reference frame is a video frame. In an implementation, an integer motion estimator component (e.g., integer estimator component 202) may perform the integer search to determine a best macro block or best shape of the reference frame. Best shape or macro block may be determined as that macro block with lowest distortion. Furthermore, the integer search may be performed initially on a largest macro block of video encoding standard (e.g., 16×16).

At block 404, updating is performed for only for all shapes of the best macro block or shape. If following integer motion estimation, each partition/shape were checked, computational bandwidth impact would be exceedingly high.

At block 406, partioning based on the best macro block is performed.

At block 408, fractional searching or motion estimation is performed on the determined best shape or macro block. The best shape or macro block is the only shape checked in fractional motion estimation. During fractional motion estimation, sub shapes of the best shape are calculated, as well as the best integer macro block or shape. There is no extra memory required to fetch those pixels since they are shared by the major shape and the sub shape and the performance is the same since the sum of absolute difference (SAD) for the major shape is the same as for the sub shapes.

At block 410, partitioning based on the fractional search is performed. If one of the sub shapes improves, then a corresponding part of the record (e.g., shapes database 204) gets updated with a new sub macro block or shapes.

At block 412, updating of the shapes for the best integer macro block or shape, and sub macro blocks and shapes is performed. After the fractional search is complete, the shape partitioning decision is made again. For example, 16×8 can still be the final macro block, but sometimes the decision changes to one of sub shapes to achieve a better result. The small fractional motion in some cases gives significantly better compression by splitting the blocks instead of staying as a larger block. Therefore, quality and compression may be improved without impacting performance or bandwidth.

In the above description of example implementations, for purposes of explanation, specific numbers, materials configurations, and other details are set forth in order to better explain the present invention, as claimed. However, it will be apparent to one skilled in the art that the claimed invention may be practiced using different details than the example ones described herein. In other instances, well-known features are omitted or simplified to clarify the description of the example implementations.

The inventors intend the described example implementations to be primarily examples. The inventors do not intend these example implementations to limit the scope of the appended claims. Rather, the inventors have contemplated that the claimed invention might also be embodied and implemented in other ways, in conjunction with other present or future technologies.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

These processes are illustrated as a collection of blocks in a logical flow graph, which represents a sequence of operations that may be implemented in mechanics alone or a combination with hardware, software, and/or firmware. In the context of software/firmware, the blocks represent instructions stored on one or more computer-readable storage media that, when executed by one or more processors, perform the recited operations.

Note that the order in which the processes are described is not intended to be construed as a limitation, and any number of the described process blocks may be combined in any order to implement the processes or an alternate process. Additionally, individual blocks may be deleted from the processes without departing from the spirit and scope of the subject matter described herein.

Figure 5:
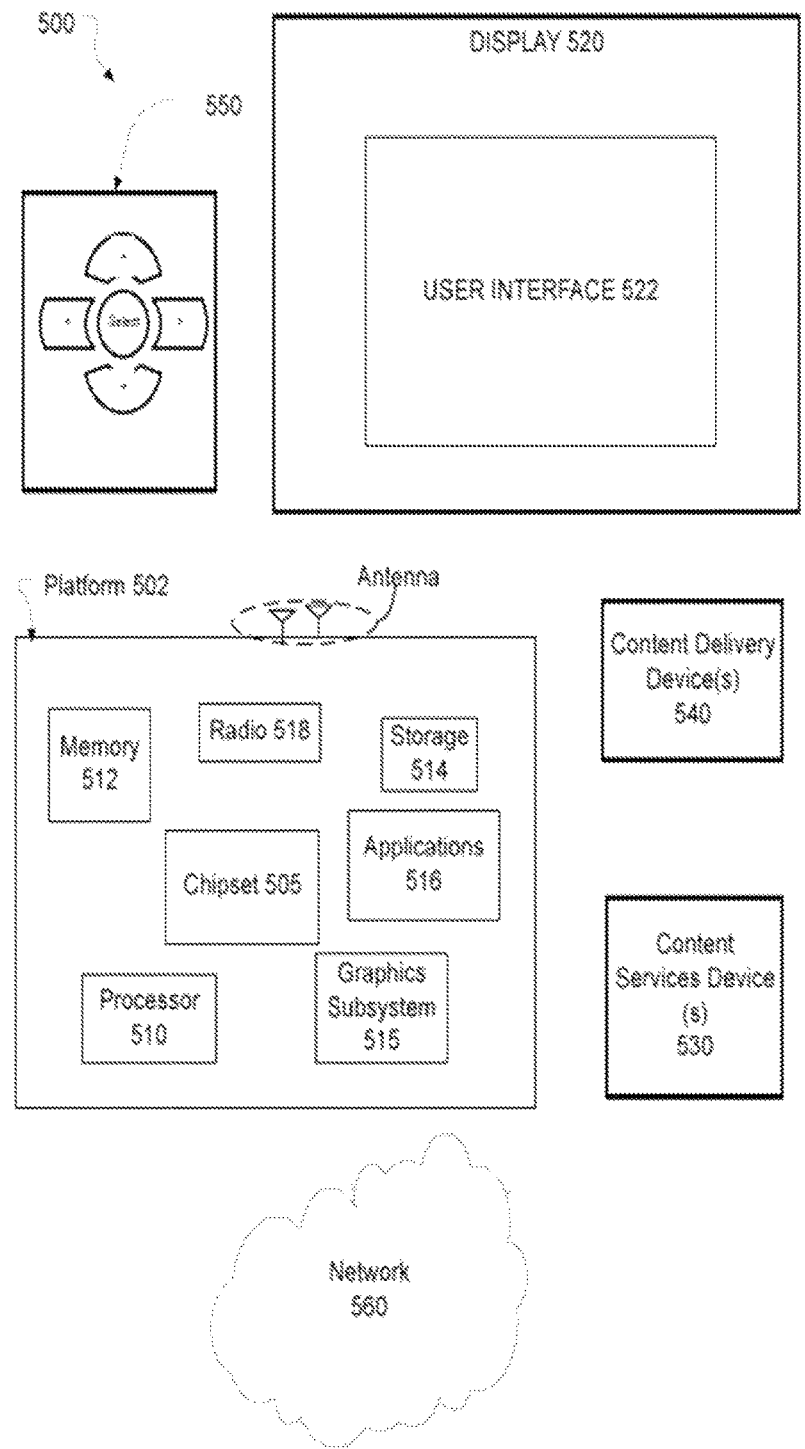
FIG. 5 is an illustrative diagram of an example system.

FIG. 5 illustrates an example system 500 in accordance with the present disclosure. In various implementations, system 500 may be a media system although system 500 is not limited to this context. For example, system 500 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 500 includes a platform 502 coupled to a display 520. Platform 502 may receive content from a content device such as content services device(s) 530 or content delivery device(s) 540 or other similar content sources. A navigation controller 550 including one or more navigation features may be used to interact with, for example, platform 502 and/or display 520. Each of these components is described in greater detail below.

In various implementations, platform 502 may include any combination of a chipset 505, processor 510, memory 512, storage 514, graphics subsystem 515, applications 516 and/or radio 518. Chipset 505 may provide intercommunication among processor 510, memory 512, storage 514, graphics subsystem 515, applications 516 and/or radio 518. For example, chipset 505 may include a storage adapter (not depicted) capable of providing intercommunication with storage 514.

Processor 510 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 510 may be dual-core processor(s), dual-core mobile processor(s), and so forth.

Memory 512 may be implemented as a volatile memory device such as, but not limited to, a Random Access Memory (RAM), Dynamic Random Access Memory (DRAM), or Static RAM (SRAM).

Storage 514 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 514 may include technology to increase the storage performance enhanced protection for valuable digital media when multiple hard drives are included, for example.

Graphics subsystem 515 may perform processing of images such as still or video for display. Graphics subsystem 515 may be a graphics processing unit (GPU) or a visual processing unit (VPU), for example. An analog or digital interface may be used to communicatively couple graphics subsystem 515 and display 520. For example, the interface may be any of a High-Definition Multimedia Interface, DisplayPort, wireless HDMI, and/or wireless HD compliant techniques. Graphics subsystem 515 may be integrated into processor 510 or chipset 505. In some implementations, graphics subsystem 515 may be a stand-alone card communicatively coupled to chipset 505.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 518 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 518 may operate in accordance with one or more applicable standards in any version.

In various implementations, display 520 may include any television type monitor or display. Display 520 may include, for example, a computer display screen, touch screen display, video monitor, television-like device, and/or a television. Display 520 may be digital and/or analog. In various implementations, display 520 may be a holographic display. Also, display 520 may be a transparent surface that may receive a visual projection. Such projections may convey various forms of information, images, and/or objects. For example, such projections may be a visual overlay for a mobile augmented reality (MAR) application. Under the control of one or more software applications 516, platform 502 may display user interface 522 on display 520.

In various implementations, content services device(s) 530 may be hosted by any national, international and/or independent service and thus accessible to platform 502 via the Internet, for example. Content services device(s) 530 may be coupled to platform 502 and/or to display 520. Platform 502 and/or content services device(s) 530 may be coupled to a network 560 to communicate (e.g., send and/or receive) media information to and from network 560. Content delivery device(s) 540 also may be coupled to platform 502 and/or to display 520.

In various implementations, content services device(s) 530 may include a cable television box, personal computer, network, telephone, Internet enabled devices or appliance capable of delivering digital information and/or content, and any other similar device capable of unidirectionally or bidirectionally communicating content between content providers and platform 502 and/display 520, via network 560 or directly. It will be appreciated that the content may be communicated unidirectionally and/or bidirectionally to and from any one of the components in system 500 and a content provider via network 560. Examples of content may include any media information including, for example, video, music, medical and gaming information, and so forth.

Content services device(s) 530 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 502 may receive control signals from navigation controller 550 having one or more navigation features. The navigation features of controller 550 may be used to interact with user interface 522, for example. In embodiments, navigation controller 550 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 550 may be replicated on a display (e.g., display 520) by movements of a pointer, cursor, focus ring, or other visual indicators displayed on the display. For example, under the control of software applications 516, the navigation features located on navigation controller 550 may be mapped to virtual navigation features displayed on user interface 522, for example. In embodiments, controller 550 may not be a separate component but may be integrated into platform 502 and/or display 520. The present disclosure, however, is not limited to the elements or in the context shown or described herein.

In various implementations, drivers (not shown) may include technology to enable users to instantly turn on and off platform 502 like a television with the touch of a button after initial boot-up, when enabled, for example. Program logic may allow platform 502 to stream content to media adaptors or other content services device(s) 530 or content delivery device(s) 540 even when the platform is turned "off." In addition, chipset 505 may include hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 500 may be integrated. For example, platform 502 and content services device(s) 530 may be integrated, or platform 502 and content delivery device(s) 540 may be integrated, or platform 502, content services device(s) 530, and content delivery device(s) 540 may be integrated, for example. In various embodiments, platform 502 and display 520 may be an integrated unit. Display 520 and content service device(s) 530 may be integrated, or display 520 and content delivery device(s) 540 may be integrated, for example. These examples are not meant to limit the present disclosure.

In various embodiments, system 500 may be implemented as a wireless system, a wired system, or a combination of both. When implemented as a wireless system, system 500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 500 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 502 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

Figure 6:
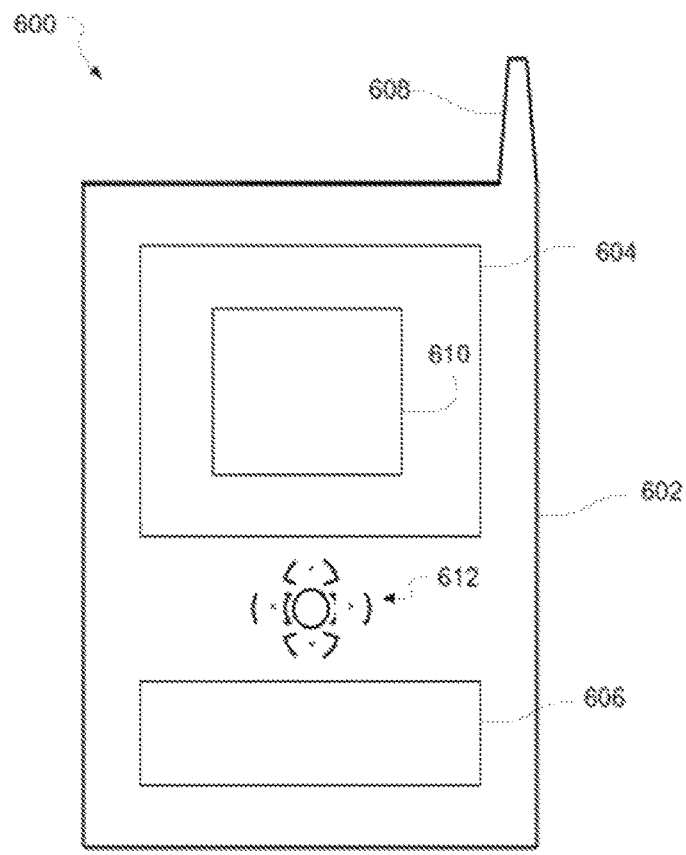
FIG. 6 is an illustrative diagram of an example device, all arranged in accordance with at least some implementations of present disclosure.

As described above, system 500 may be embodied in varying physical styles or form factors. FIG. 6 illustrates implementations of a small form factor device 600 in which system 500 may be embodied. In embodiments, for example, device 600 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 6, device 600 may include a housing 602, a display 604, an input/output (I/O) device 606, and an antenna 608. Device 600 also may include navigation features 612. Display 604 may include any suitable display unit for displaying information appropriate for a mobile computing device. I/O device 606 may include any suitable I/O device for entering information into a mobile computing device. Examples for I/O device 606 may include an alphanumeric keyboard, a numeric keypad, a touch pad, input keys, buttons, switches, rocker switches, microphones, speakers, voice recognition device and software, and so forth. Information also may be entered into device 600 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

The following examples pertain to further embodiments. A device comprising: one or more processors; memory configured to the processors; an encoder configured to the processors and memory comprising: an integer motion estimator component to perform an integer search for a best macro block of a reference frame; a database of shapes to be updated based on the best macro block; a partitioner component to provide the best macro block; and a fractional motion estimator component to perform a fractional prediction on current pixels of the best macro block, and determines if an improvement occurs as to a sub macro block of the best macro block, wherein the database of shapes is updated for shapes of a new sub macro block if an improvement is determined.

In certain implementations, a device wherein the integer motion estimator component receives video data from one or more video sources.

In certain implementations, a device wherein the integer motion estimator component performs the integer search based initially on a largest macro block of video encoding standard.

In certain implementations, a device wherein the integer motion estimator component searches the best macro block based at least on the macro block with lowest distortion.

In certain implementations, a device wherein the partitioner performs another partition to provide the best macro block based on fractional estimation.

In certain implementations, a device wherein the fractional motion estimator component checks underlying pixels of the best macro blocks as to the sub macro blocks.

In certain implementations, a device wherein the fractional motion estimator component interactively interpolates fractional locations to determine improvement as to the sub macro block of the best macro block.

In certain implementations, a device wherein the database of shapes includes different databases for different macro blocks and sub macro blocks, wherein the database of shapes are updated at the same time.

In certain implementations, a device wherein the improvement is determined based on one or more metrics, including distortion.

In certain implementations, a device wherein the encoder performs encoding that is either a part of a central processing unit, a part of integrated circuit chipset, or a separate component.

A video encoder comprising: an integer motion estimator component to perform an integer estimation for a best macro block of a reference frame; a database of shapes to be updated based on the best macro block; a partitioner component to provide the best macro block; and a fractional motion estimator component to perform a fractional estimation on the best macro block, and determines if an improvement occurs over the best macro block, wherein the database of shapes is updated for all shapes and sub shapes of the best macro block if the improvement is determined.

In certain implementations, a video encoder wherein the integer motion estimator component receives video data that is to be encoded and compressed.

In certain implementations, a video encoder wherein the integer motion estimator component performs the integer search based initially on a largest macro block of video encoding standard to search for the best macro block.

In certain implementations, a video encoder wherein the integer motion estimator component searches the best macro block based at least on the macro block with lowest distortion.

In certain implementations, a video encoder wherein the partitioner provides the best macro block based on the fractional prediction.

In certain implementations, a video encoder wherein the fractional motion estimator component checks underlying pixels of the best macro blocks as to sub macro blocks.

In certain implementations, a video encoder wherein the fractional motion estimator component interactively interpolates fractional locations to determine improvement as to sub macro block of the best macro block.

In certain implementations, a video encoder wherein the database of shapes includes different databases for different macro blocks and sub macro blocks, wherein the database of shapes are updated at the same time.

In certain implementations, a video encoder wherein the improvement is determined based on one or more metrics, including distortion.

In certain implementations, a video encoder wherein encoding is either a part of a central processing unit, a part of integrated circuit chipset, or a separate component.

A method of fractional motion estimation comprising: performing an integer search on a reference video frame; determining a best shape of the reference video frame; updating all shapes of the best shape; performing a fractional search on the best shape and sub shapes of the best shape; determining if an improvement occurs in any of the sub shapes over the best shape; updating all shapes of a new sub shape, if an improvement is determined over the best shape; and changing the best shape to the new sub shape, if an improvement is determined over the best shape.

In certain implementations, a method wherein the performing an integer estimation is based initially on a largest macro block of video encoding standard.

In certain implementations, a method wherein the reference video frame is from digital video source to be compressed and encoded.

In certain implementations, a method wherein the updating all shapes of the best shape and the new sub shape are performed at the same time on one or more databases.

In certain implementations, a method wherein the performing of a fractional search includes changing mode selection and shape sizes during the fractional searching.

In certain implementations, a method wherein the performing of the fractional search is based on one of following standards: Advanced Video Coding (AVC), Motion Pictures Experts Group 2 (MPEG2), Scaleable Video Coding (SVC), and High Efficiency Video Coding (HEVC).

In certain implementations, a method wherein the determining if the improvement occurs is based on checking underlying pixels of the best shape as to sub shapes.

In certain implementations, a method wherein the determining if the improvement occurs includes interactive interpolation of fractional locations to determine the improvement as to the sub shape of the best shape.

In certain implementations, a method wherein the determining if the improvement occurs is based on or more metrics including distortion of frames.

In certain implementations, a method wherein the method is performed by a codec.

What is claimed is:

1. A device comprising:
   one or more processors;
   a memory communicatively coupled to the one or more processors; and
   an encoder communicatively coupled to the one or more processors and the memory, and comprising:
   an integer motion estimator component configured to perform an initial integer search and to determine a largest macro block with a lowest distortion from among a plurality of macro blocks of a reference frame;
   a fractional motion estimator configured to perform a fractional prediction and to interpolate fractional locations on current pixels of only the determined largest macro block;
   a database of shapes configured to: store a record of shapes, be updated based on the determined largest macro block to provide an updated macro block, and be updated based on the fractional prediction and the fractional location interpolation on the current pixels of the largest macro block to provide an updated sub macro block,
   wherein the integer motion estimator further being configured to perform a distortion-comparison between the updated macro block and the updated sub macro block; and
   a partitioner configured to provide the updated macro block or the updated sub macro block based on the performed distortion-comparison.

2. The device of claim 1, wherein the integer motion estimator performs the initial integer search based initially on the largest macro block of a video encoding standard.

3. The device of claim 1, wherein the integer motion estimator searches for the largest macro block based at least on the macro block with the lowest distortion.

4. The device of claim 1, wherein the fractional motion estimator checks underlying pixels of the largest macro block as to the sub macro blocks.

5. The device of claim 1, wherein the fractional motion estimator interactively interpolates the fractional locations to determine an improvement as to the sub macro block of the largest macro block with the lowest distortion.

6. The device of claim 1, wherein the database of shapes includes different databases for different macro blocks and sub macro blocks, wherein the different databases are updated at a same time.

7. The device of claim 1, wherein the encoder is comprised within central processor comprised within an application specific integrated circuit, or is implemented on a separate circuit.

8. A video encoder comprising:
an integer motion estimator configured to perform an integer estimation and to determine a largest macro block with a lowest distortion from among a plurality of macro blocks of a reference frame;
a database of shapes configured to store a record of shapes, and to be updated based on the determined largest macro block to provide an updated macro block;
a fractional motion estimator configured to perform a fractional estimation and to interpolate fractional locations of only the determined largest macro block, and to determine if an improvement occurs on sub macro blocks of the determined largest macro block, wherein the database of shapes is updated based on the fractional motion estimation and the fractional location interpolation of the determined largest macro block to provide an updated sub macro block, the integer motion estimator further being configured to perform a distortion-comparison between the updated macro block and the updated sub macro block; and
a partitioner configured to provide the updated macro block or the updated sub macro block based on the performed distortion-comparison.

9. The video encoder of claim 8, wherein the integer motion estimator initially searches the macro block based at least on the largest macro block with lowest distortion.

10. The video encoder of claim 8, wherein the partitioner provides the updated macro block based on the fractional estimation.

11. The video encoder of claim 8, wherein the fractional motion estimator checks underlying pixels of the determined largest macro block as to sub macro blocks.

12. The video encoder of claim 8, wherein the fractional motion estimator interactively interpolates the fractional locations to determine the improvement as to sub macro block of the determined largest macro block.

13. The video encoder of claim 8, wherein the database of shapes includes different databases for different macro blocks and sub macro blocks, wherein the different databases are updated at a same time.

14. The video encoder of claim 11, wherein the video encoder is comprised within a central processor, comprised within an application specific integrated circuit, or is implemented on a separate circuit.

15. A method of fractional motion estimation comprising:
performing an integer search and determining a largest macro block with a lowest distortion from among a plurality of macro blocks of a reference video frame;
performing a fractional search only on the determined largest macro block and sub macro blocks of the largest macro block;
updating a database of shapes for the largest macro block and sub macro blocks to provide an updated macro block and updated sub macro blocks;
comparing distortions between the updated macro block and the updated sub macro blocks; and
choosing the updated macro block or the updated sub macro block for video encoding based on the distortion-comparison.

16. The method of claim 15, wherein the reference video frame is from a digital video source to be compressed and encoded.

17. The method of claim 15, wherein the updating of the database of shapes for the largest macro block and the sub macro blocks is performed at a same time on one or more databases.

18. The method of claim 15, wherein the performing of the fractional search includes changing a mode selection and a macro block size during the fractional searching.

19. The method of claim 15, further comprising:
an interactive interpolation of fractional locations to determine an improvement as to the sub macro blocks of the determined largest macro block.

20. The method of claim 15, wherein the method is performed by a codec.

* * * * *